United States Patent

[11] 3,612,429

[72] Inventor Hans A. Koenig
4313 Joplin Drive, Rockville, Md. 20853
[21] Appl. No. 10,600
[22] Filed Feb. 11, 1970
[45] Patented Oct. 12, 1971
Continuation-in-part of application Ser. No. 871,460, June 19, 1969, now abandoned, Continuation-in-part of application Ser. No. 724,725, Apr. 29, 1968, now abandoned.

[54] INSULATED WIRE COIL
10 Claims, 5 Drawing Figs.
[52] U.S. Cl. .................................................. 242/159
[51] Int. Cl. .............................................. B65h 55/00
[50] Field of Search ....................................... 242/159, 164, 170, 171, 172, 174, 176, 178, 54, 1

[56] References Cited
UNITED STATES PATENTS
2,552,594   5/1951   Scott, Jr. .................... 242/164 X
2,639,097   5/1953   Scott, Jr. .................... 242/159 X
2,709,553   5/1955   Wellcome ..................... 242/54
2,973,911   3/1961   Rayburn ...................... 242/159 X
3,266,423   8/1966   Simpson ...................... 242/159 X Primary Examiner—Stanley N. Gilreath
Attorney—Lawrence W. Hicks ABSTRACT: A conductive wire coil of insulated wire or cable, stretches of which are wound in opposite directions to minimize inductive effect, in which the wire is paid out internally at high lineal rates of speed without rotating the coil assembly, and which includes protective wire turn pads of soluble material placed at reversal points. The pads are grooved so as to provide 180° turn guides for the wire to insure against breakage of insulation, and are of sufficient thickness to protect the turn loops of wire therein from being cut by overlaid layers. The soluble pads dissolve rapidly upon exposure to sea water during payout so that they do not snarl or cause breakage of wire.

PATENTED OCT 12 1971 3,612,429

INVENTOR HANS A. KOENIG
BY ATTORNEY

INSULATED WIRE COIL

CROSS-REFERENCE TO RELATED APPLICATION

This application is a continuation-in-part of Ser. No. 871,460, filed June 19, 1969, now abandoned, a continuation-in-part of application Ser. No. 724,725, filed on Apr. 29, 1968, now abandoned.

BACKGROUND OF THE INVENTION

1. Field of the Invention

This invention pertains to an improved wire coil structure for use where high-speed payout of wire is needed. The invention finds utility in underwater instrumentation and particularly for use with underwater communication equipment and the like. The coils may consist of various lengths of insulated wire or cable and since they may serve as electric communication links, a high degree of care is required to preserve their integrity and characteristics. In some installations, such coils are used in pairs, one of them being mounted on an instrument package, the other on a support ship. When the instrument package is released, the wire is paid out from both coils at a high rate of speed by drawing it from the interior diameter of each coil without bodily rotation thereof.

2. Description of the Prior Art

Interior payout coils of the general type disclosed herein are known in the prior art, for example in U.S. Pat. Nos. to Wellcome, No. 2,709,553 and Rayburn, No. 2,973,911, which deal with some of the mechanical problems involved. The specific problem which this invention is designed to solve arises in reversibly wound coils, in which the direction of winding is reversed at predetermined intervals to neutralize inductive effects of superimposed layers. At each point of reversal the wire must be bent upon itself approximately 180°; no sharp bend is permissible as it may cause a break in insulation and snarling in payout; on the other hand, a half-loop turn leaves an increment of wire lying substantially at right angles (axially of the coil) to the underlying and overlying convolutions of wire which are prone to cut the insulation at the half-loop.

SUMMARY OF THE INVENTION

The object of this invention is to provide a reversely wound coil which eliminates the aforesaid problem of damage to wire at points of reversal.

A more specific object is to provide a reversely wound coil incorporating protective pads at points of reversal, which pads have guides or grooves for confining the half-loop wire turn, and which are thick enough to protect the looped portions within the grooves from being cut by overlaid convolutions of said wire.

A still further object of this invention is to make said pads of readily water-soluble material so that they disintegrate in an aqueous medium and do not snag or snarl the wire during payout.

DESCRIPTION OF THE INVENTION

Figure 1:
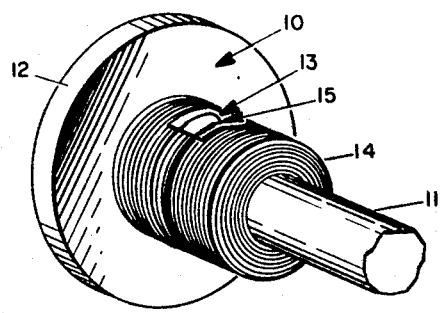
FIG. 1 is a fragmentary perspective view of a wire coil showing a protective pad in place as the coil is being formed.

Referring to FIG. 1, the spool employed in winding the coil is 10. It is comprised of mandrel 11 and end plates 12, one of which is shown. After winding of a coil is completed, the coil is enclosed in an outer casing (not shown) which retains the end plates in the same fixed relation which they occupied during winding, and the mandrel is removed leaving the coiled wire free for internal payout. After having wound a predetermined length of wire as shown, a pad 13, described in greater detail below, is placed as illustrated and wire 14 is fitted into the horseshoe groove 15 therein so that it emerges in the reverse direction. The winding processes continue with the overlaid convolutions compressing and retaining the pad in place, without undue cutting stress on the wire within the groove.

Figure 2:
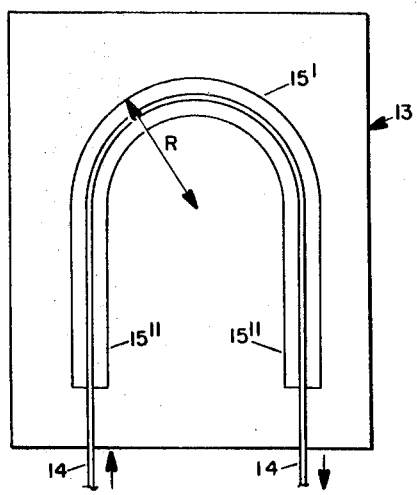
FIG. 2 is a plan view of a protective pad with a horseshoe cutout and a half-loop of wire therein.
Figure 3:
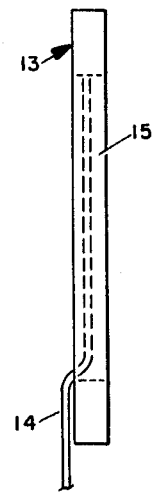
FIG. 3 is an end view of said pad.

FIGS. 2 and 3 show the pad in greater detail, the size and thickness of pad 13 will depend on the size and, to a degree, on the nature of wire 14 that is being wound, as will the radius of the half-loop therein. For example, with wire of 0.038 external diameter it has been found that a pad of approximately 1⅝-inch by 1½-inch area and 3/32 inch thickness (uncompressed) produces satisfactory results. Groove 15 is cut through the entire pad thickness, and is shaped to include a half-loop portion 15' and elongated extensions 15'' serving to guide the wire in and out of same. The pad will flatten substantially upon compression between adjoining convolutions and provide adequate clearance for wire 14 within the groove.

The pad 13 comprises a sheet of commercially available "Dissolvo" paper manufactured by the Gilbreth Co., Philadelphia, Pa., that is folded into thirty layers, and the horseshoe groove cut therein as illustrated. This paper has a property of rapid dissolution and disintegration upon contact with water, which is requisite for the purpose intended. The laminated sheet construction provides for higher water permeability and faster dissolution of the material, and the folded uncut portions serve to hold the plies intact during assembly.

Figure 4:
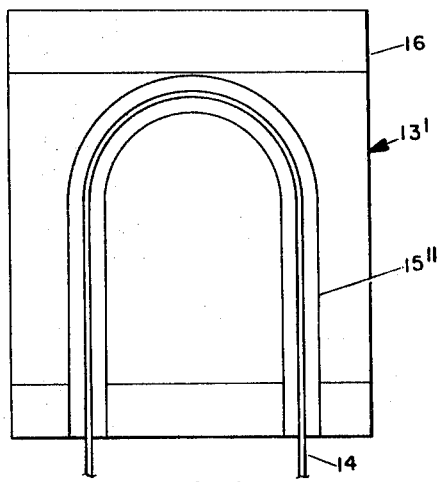
FIGS. 4 and 5 are plan and end views of a modified pad, respectively.
Figure 5:
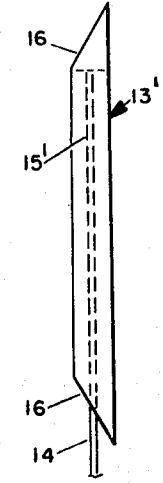

The modification of FIGS. 4 and 5 shows an end view of an alternative pad construction, wherein the unit is molded of the same soluble material and has wedge-shaped edges 16 at the upper and lower ends thereof which serve to eliminate bulges and permit smooth entry of wire 14 into the horseshoe groove, as well as smoother approaches to the pad as a whole by overlying convolutions. The elongated extensions of the groove extend clear to one edge of the pad in this embodiment.

While the above description refers to wire, it should be understood that the term is intended to cover multiconductor cable of solid or stranded conductors encased in an exterior insulating cover, all as known and practiced in the prior art. Also, it is to be understood that other applications of the wire turn pad than those specifically described are possible, as are modifications in the outline and construction of the pad itself, all within the scope of the claims which follow

I claim:

1. In a reversely wound coil of insulated wire having a multiplicity of convolutions and at least one wire reversal point, means for preventing damage to the insulation and kinking or breakage at (point of wire reversal) said at least one wire reversal point comprising a pad having a wire receiving guide therein, said guide defining a turn-around half-loop and entry–exit passages thereto and the pad material being of sufficient thickness to protect the increment of wire fitted within said guide.

2. A reversely wound coil according to claim 1, wherein the pad is constructed of a material which disintegrates rapidly upon contact with water.

3. A reversely wound coil according to claim 1, wherein the rapidly disintegrating material is water soluble paper.

4. A reversely wound coil according to claim 1, wherein the desired thickness of a pad is attained by multiply paper construction which accelerates water penetration thereinto and resultant disintegration of the pad upon contact.

5. A reversely wound coil according to claim 1 in which the pad is flexible and conforms to the convolutions of the coil.

6. A reversely wound coil according to claim 5, wherein the pad is of a thickness greater than the wire diameter when fitted on the coil but is compressed by overlaid convolutions of wire to a thickness substantially equal to the diameter thereof, and wherein the guide is a groove cut through the entire thickness of the pad.

7. A reversely wound coil according to claim 6 in which the pad is provided with beveled edges and the groove extends to one edge thereof to provide for smoother wire entry into the groove thereof and for hump-free laying of superimposed wire convolutions.

8. A reversely wound coil as in claim 1, having a plurality of (reversed convolutions) wire reversal points therein and a plurality of protective pads, one at each reversal point.

9. A reversely wound coil as in claim 8, in which the wire is paid out internally at a high rate of speed while submerged in sea water, and in which the pads are constructed of soluble material so that they disintegrate upon contact therewith without obstructing the payout operation.

10. A reversely wound coil according to claim 8, wherein the pads inserted at the wire reversal points of the coil are retained in place by underlying and superimposed convolutions of said wire.